(12) United States Patent
Labba

(10) Patent No.: US 12,208,533 B2
(45) Date of Patent: Jan. 28, 2025

(54) DEMOLITION ROBOT

(71) Applicant: BROKK AKTIEBOLAG, Skellefteå (SE)

(72) Inventor: Anders Labba, Kåge (SE)

(73) Assignee: BROKK AKTIEBOLAG, Skellefteå (SE)

( * ) Notice: Subject to any disclaimer, the term of this patent is extended or adjusted under 35 U.S.C. 154(b) by 339 days.

(21) Appl. No.: 17/904,839

(22) PCT Filed: Feb. 25, 2021

(86) PCT No.: PCT/SE2021/050160
§ 371 (c)(1),
(2) Date: Aug. 23, 2022

(87) PCT Pub. No.: WO2021/173067
PCT Pub. Date: Sep. 2, 2021

(65) Prior Publication Data
US 2023/0103522 A1    Apr. 6, 2023

(30) Foreign Application Priority Data
Feb. 25, 2020   (SE) .................................... 2050210-0

(51) Int. Cl.
*B27B 5/32*       (2006.01)
*B25J 11/00*      (2006.01)
(Continued)

(52) U.S. Cl.
CPC ........... *B27B 5/325* (2013.01); *B25J 11/0055* (2013.01); *B25J 15/0458* (2013.01); *B27B 5/10* (2013.01)

(58) Field of Classification Search
CPC .. B27B 5/325; B27B 5/29; B27B 5/30; B27B 5/32; B27B 5/10; B25J 11/0055; B25J 15/0458
See application file for complete search history.

(56) References Cited

U.S. PATENT DOCUMENTS

| 4,652,203 A | 3/1987 | Nakashima et al. |
| 4,897,014 A * | 1/1990 | Tietze .................. B25J 15/0491 |
| | | 414/729 |

(Continued)

FOREIGN PATENT DOCUMENTS

| DE | 3142102 A1 | 5/1983 |
| EP | 2277671 A1 | 1/2011 |

(Continued)

OTHER PUBLICATIONS

European Extended Search Report dated Feb. 7, 2024 in corresponding European Patent Application No. 21760853.8 (5 pages).

(Continued)

*Primary Examiner* — Phong H Nguyen
(74) *Attorney, Agent, or Firm* — Knobbe, Martens, Olson & Bear, LLP

(57) ABSTRACT

A demolition robot (1) comprises a robot arm (2) and a saw tool (3) having an exchangeable saw blade (5), wherein the saw tool comprises a rotatable spindle (4) with an end portion (4.1) and a saw blade comprising a hub (6), and the saw blade hub is releasably arranged on the end portion (4.1) of the spindle with a torque-transmitting connection (7), and wherein a release mechanism (30) for automatic exchange of the saw blade (5) is arranged on the robot arm.

13 Claims, 3 Drawing Sheets

(51) Int. Cl.
*B25J 15/04* (2006.01)
*B27B 5/10* (2006.01)

(56) References Cited

U.S. PATENT DOCUMENTS

| | | | | |
|---|---|---|---|---|
| 5,676,125 | A * | 10/1997 | Kelly | B28D 1/045 125/13.03 |
| 10,422,357 | B2 * | 9/2019 | Olsson | E02F 9/2203 |
| 2005/0119096 | A1 | 6/2005 | Navar | |
| 2010/0040474 | A1 * | 2/2010 | Takahashi | B27B 5/38 416/219 R |

FOREIGN PATENT DOCUMENTS

| | | |
|---|---|---|
| JP | H11-235609 A | 8/1999 |
| JP | H11-347870 A | 1/2011 |
| JP | 2020-104251 A | 7/2020 |
| WO | 2017069692 A1 | 4/2017 |

OTHER PUBLICATIONS

International Preliminary Report on Patentability issued for International Patent Application No. PCT/SE2021/050160, dated May 19, 2022 in 21 pages.
International Search Report and Written Opinion issued for International Patent Application No. PCT/SE2021/050160, dated May 12, 2021 in 18 pages.
Swedish Search Report issued for Swedish Patent Application No. 2050210-0, dated Oct. 12, 2020 in 11 pages.

* cited by examiner

DEMOLITION ROBOT

CROSS-REFERENCE TO RELATED APPLICATIONS

This application is the U.S. National Phase under 35. U.S.C. § 371 of International Application PCT/SE2021/050160, filed Feb. 25, 2021, which claims priority Swedish Patent Application No. 2050210-0, filed Feb. 25, 2020. The disclosures of the above-described applications are hereby incorporated by reference in their entirety.

FIELD OF THE INVENTION

The present invention relates to a remote-controllable demolition robot, carrying a tool with exchangeable components, in particular a remote-controllable demolition robot with a saw tool that has an exchangeable rotatable saw blade, as well as a method for remote-controllable automatic exchange of a saw blade on a saw tool.

BACKGROUND OF THE INVENTION

A remote-controlled demolition robot can be equipped with various types of tool for demolition. For example, the demolition robot can carry a cut-off saw tool with a rotatable blade or saw blade for cutting steel and other materials in various forms. The saw blade of the cut-off saw is a consumption material that is worn and must be replaced when it is used up, whereupon the saw blade is typically replaced manually by the operator. In dangerous work environments, where the demolition robot is often be used, it can, however, be very inopportune for the operator to be in the immediate proximity of the work area of the demolition robot. This problem arises e.g. when the demolition robot is used in environments or surroundings, where radioactive radiation or dangerous gases belong to the risk picture. In the environments where the levels of radioactive radiation are so high that there is a risk that the operator is exposed to hazard or that the accumulated dose of radiation to which the operator can be exposed exceeds permitted levels, difficulties arise to manually perform exchange of the saw blade of the cut-saw tool in an efficient manner.

SUMMARY OF THE INVENTION

The present invention is intended to obtain a remote-controllable demolition robot, which comprises a cut-saw tool with an exchangeable saw blade, which can reliably and automatically replace the rotatable saw blade without the operator having to perform manual actions, in order to improve safety and reduce work environment risks for the operator.

According to the invention, this purpose is resolved by a demolition robot having the features and characteristics stated in claim 1. This object is also obtained with a method for remote-controlled automatic exchange of the saw blade on the saw tool associated with a demolition robot with features and characteristics according to the accompanying claims.

The invention means that worn components associated with a saw tool carried by a remote-controlled demolition robot can be replaced by new components in a remote-controlled, automatic and reliable manner without manual efforts by the operator, who then does not have to be exposed to e.g. radioactivity or dangerous gases in a risky work environment, when the demolition robot is operating.

A detailed description of the invention follows below, from which further advantages appear.

BRIEF DESCRIPTION OF THE DRAWINGS

In the following, a demolition robot according to the invention is described, wherein.

DETAILED DESCRIPTION OF THE PREFERRED EMBODIMENTS

Figure 1:
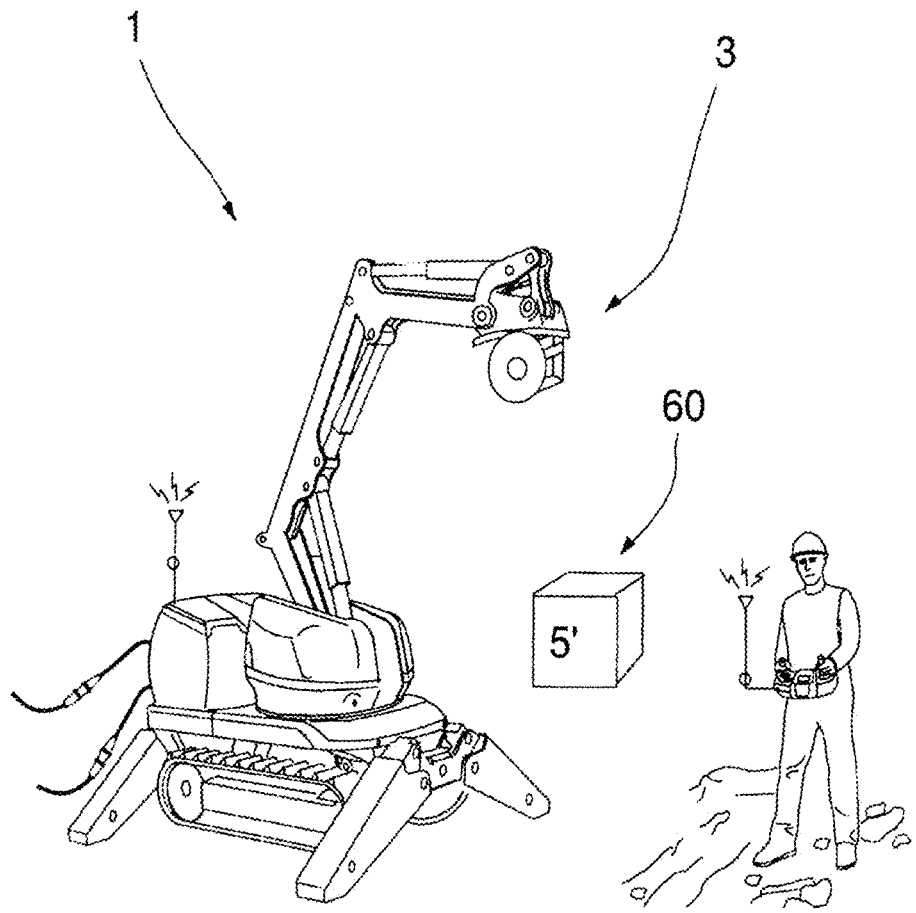
FIG. 1 illustrates a demolition robot with a cut-off saw according to the invention

FIG. 1 shows a remote-controlled demolition robot 1 with a saw tool 3 carried by a free end of a manoeuvrable robot arm 2 associated with the demolition robot. An operator walks beside the demolition robot and remote-controls it via a radio link by means of a portable operation cabinet equipped with the required joysticks and regulator.

Figure 2A:
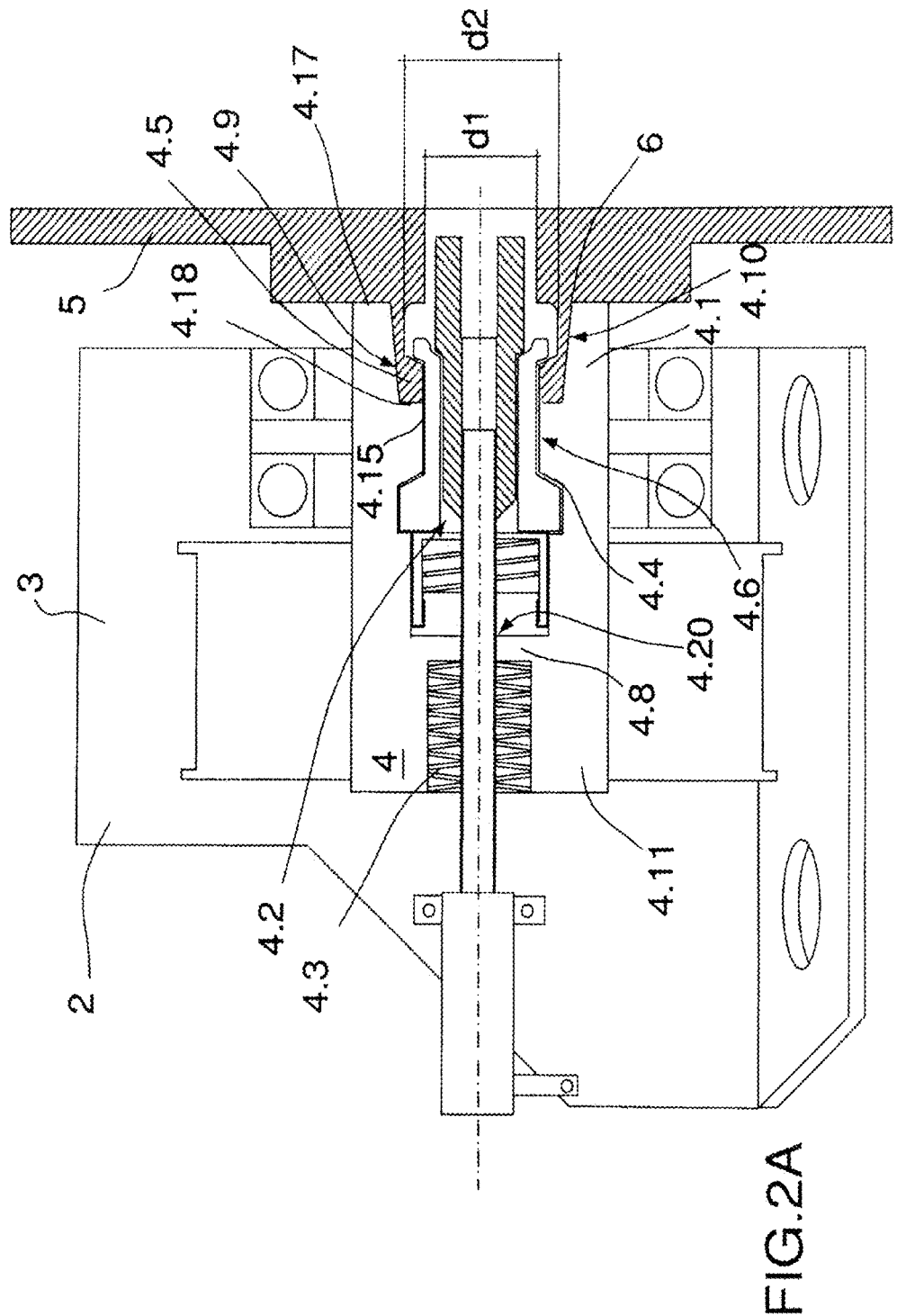
FIGS. 2A-2B show an enlarged and simplified illustration of a robot arm of a demolition robot with a cut-off saw according to the invention. The figures show the cut-off saw tool in a longitudinal sectional view.
Figure 2B:
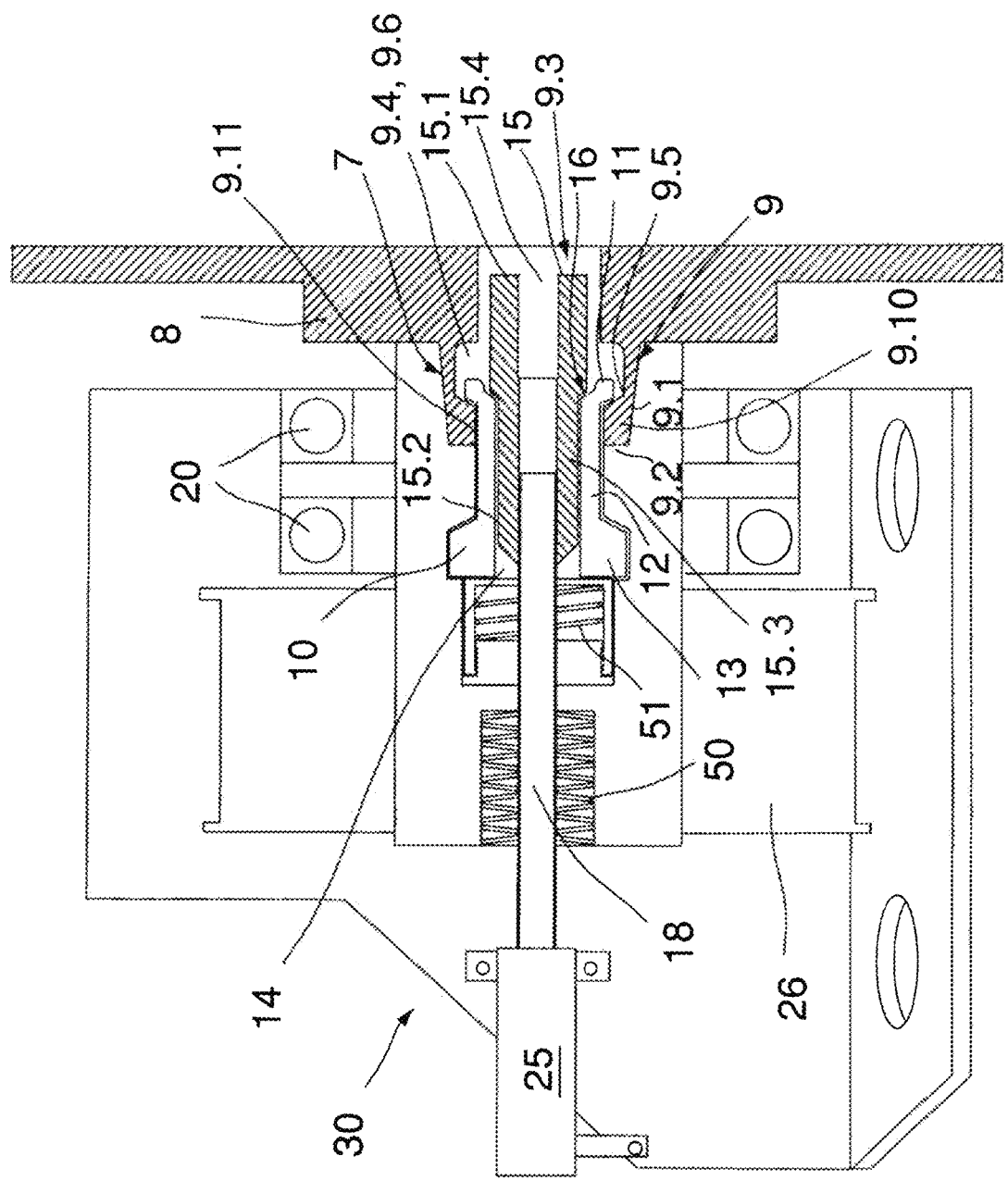

FIGS. 2A-2B illustrate the demolition robot's robot arm 2 carrying a cut-off saw tool 3 with an exchangeable rotatable saw blade 5. The saw blade is typically a disc-shaped rotationally symmetrical saw blade with a hub 6 configured to be releasably mounted on an end portion 4.1 associated with the rotatable spindle 4 of the cut-off saw tool. The saw blade 5 with the hub 6 is releasably arranged on the spindle end portion 4.1 with a torque-transmitting connection 7. A release mechanism 30 for remote-controllable automatic exchange of the saw blade is arranged on the robot arm 2. The release mechanism 30, comprising a remote-controllable hydraulic cylinder, is arranged on the robot arm adjacent to the spindle and on the same side as the spindle relative to the saw blade.

The saw blade hub 6 has a first end connected with the saw blade 5, a hub flange 8 connected with the saw blade 1 and a second end 9 facing the spindle 4. The second hub end 9 has the shape of a truncated cone with an outer conical envelope surface 9.1 with a decreasing diameter in the direction from the saw blade 5 and a plane end surface 9.2 in the radial plane.

FIG. 2B shows that the hub end 9 is configured as an annular end portion 9.10, the outer conical envelope surface 9.1 of which is configured to cooperate shape-wise with an inner conical clamping surface 4.10 associated with the spindle, and wherein the hub end surface 9.2 abuts and shape-wise cooperates with an inner bearing surface 4.18 associated with the spindle at insertion of the hub 6 in the spindle end portion 4.1 to obtain a radially as well as axially correct position of the saw blade on the spindle.

The saw blade hub has a central longitudinal opening 9.3, extending between the ends of the hub and having an inner limitation surface 9.4 with varying cross sections. The annular end portion 9.10 has a bearing surface 9.11 facing the rotational axis and configured to abut against an intermediate piece 12 associated with a blocking element 10, wherein the longitudinal opening 9.3 has a first inner diameter d1 along the bearing surface 9.11. The inner limitation surface 9.4 is enlarged in the radial direction within the second hub end 9 and forms an axially extended inner cavity 9.6 with a second inner diameter d2, which is larger than d1. In the cavity 9.6, the inner limitation surface 9.4 is adjacent to the bearing surface 9.11, the saw blade hub has an internally arranged conically shaped inner engagement surface 9.5, which is circumferential and configured with increasing diameter towards the saw blade. The engagement surface 9.5 of the hub is configured to cooperate with a blocking element 10 via inverse engagement, so that the saw blade 5 can releasably be retained on the spindle 4 under the influence of an applied tension force, for instance generated by a drive spring 50 that clamps the hub of the saw blade fixedly against the end of the spindle. The longitudinal opening 9.3 and inner cavity 9.6 of the hub are arranged to receive the blocking element 10 with a corresponding plurality of pawls 11 as well as a maneuvering sleeve 15, wherein the blocking element 10 is adapted to be inserted through the longitudinal opening 9.3 ending at the second end 9 of the hub and to extend into the cavity 9.6 to couple together the hub of the saw blade with the spindle.

The cut-off saw tool has a rotatable spindle 4, which is mounted in a bearing housing 20 arranged on the robot arm. The spindle has a first end 4.1 that protrudes from the bearing housing and is arranged adjacent to the hub 6. The first end 4.1 of the spindle has a first impact surface 4.17 in the radial plane (i.e. perpendicular to the rotational axis of the spindle), which is arranged to abut against the flange 8 associated with the hub as well as a receiving portion 4.5, which is configured as a notch at the spindle end 4.1. The receiving portion 4.5 has an inner conical clamping surface 4.10 connected with the impact surface 4.17 and an inner plane bearing surface 4.18 in the radial plane, which surrounds a central opening 4.15. The conical clamping surface 4.10 of the spindle is configured for receiving the hub of the saw blade and shape-wise cooperating with the outer conical envelope surface 9.1 associated with the hub and forming the torque-transmitting connection 7 configured as a conical clamping connection, which during operation of the cut-off saw tool transmits the emerging torque from the spindle to the blade.

The spindle 4 comprises at least two rotationally symmetrical cavities 4.2,4.3 arranged internally and separated by a partition wall 4.8, which includes a through-going central drilled hole 4.20 arranged along the rotational axis of the spindle, wherein the central opening 4.15 leads to the first cavity 4.2.

The first cavity 4.2 is intended to receive the sleeve-like blocking element 10 and has an inner limitation surface with varying form and cross section, which shape-wise corresponds to the configuration of the blocking element in order to, by rotational driving, retain the blocking element 10, which is integrated in the spindle and rotatable with the spindle. The cavity comprises a passage 4.6 with a reduced diameter connected to the receiving portion 4.5. The passage is arranged for receiving an intermediate piece 12 associated with the blocking element 10. The passage 4.6 is enlarged to an internal compartment arranged for receiving a rear end 13 of the blocking means. The internal compartment has an inner conical impact surface 4.4 intended to abut against the rear blocking means 13 of the blocking element. Adjacent to the partition wall 4.8, the first cavity 4.2 has a cylindrical compartment with a reduced cross section in comparison with the cross section of the internal compartment arranged for accommodating the rear end of the blocking element. The cylindrical compartment is configured for accommodating a compression spring 51 with as associated casing. The second cavity 4.3 closest to the second end of the spindle is cylindrical with a uniform cross section, wherein a tension spring 50 is arranged, which is connected with a pulling rod 18.

The spindle has a second end 4.11 connected with the transmission, a belt pulley 26. The belt pulley is connected with a belt to a driving motor (not shown in the figure), so that the torque from the driving motor is transferred via the belt to the belt pulley 26, which is mounted on the spindle 4, so that the spindle is caused to rotate. The second end 4.11 of the spindle is facing a remote-controllable hydraulic cylinder 25, which is arranged to activate a release of the saw blade, when automatic exchange of the saw blade is to be executed.

FIG. 2B shows the sleeve-like blocking element 10, which has a first end with a plurality of radially outwardly directed pawls 11 arranged around the circumference, and which are resiliently and radially manoeuvrable, and a second annular end with a least one radially outwardly directed rear blocking means 13 as well as an intermediate piece 12 that connects the first and the second end. The blocking element 10 is integrated in the spindle by being partially arranged within the first cavity 4.2 of the spindle.

The blocking element has an axially directed central feed-through opening 14, in which a maneuvering means 18 coupled to the maneuvering sleeve 15 is inserted, whereby the maneuvering sleeve 15 projects from the feed-through opening in the longitudinal cavity of the hub towards the saw blade.

The rear blocking means 13 of the blocking element has an abutment surface that shape-wise cooperates with the cavity's inner conical impact surface 4.4 arranged in the internal compartment of the cavity and part of the intermediate piece 12 of the blocking element is arranged in the passage 4.6. The first end of the blocking element carrying the pawls 11 protrudes from the central opening 4.15 of the spindle to the receiving portion 4.5 of the spindle, so that the pawls 11 are arranged in an axial position between the inner bearing surface 4.18 of the spindle and the first impact surface 4.17. As shown in FIGS. 2A-2B, the blocking element is inserted through the longitudinal opening 9.3 of the hub to the enlarged inner cavity 9.6 at the second end 9 of the hub when a saw blade hub is inserted in the receiving portion 4.5 of the spindle. Together with the maneuvering sleeve 15, the function of the blocking element 10 is to couple the saw blade hub with the spindle 4 in a locked state, both radially and axially in a functional and reliable manner and block, prevent the saw blade hub 6 from being released from the spindle. The radially outwardly directed pawls 11 are resiliently and radially manoeuvrable and configured to engage with and capture the inner conical engagement surface of the hub. The maneuvering sleeve is arranged, in an activated state, a locked state, to operate the blocking element 10 to releasably retain the saw blade hub by pressing the pawls radially outwards for engagement with the engagement surface 9.5 of the hub and thereby releasably retain the saw blade hub 6 against the spindle.

The blocking element 10 and the maneuvering sleeve 15 thereby apply a clamping force against the hub's inner engagement surface 9.5, which releasably clamps the saw blade hub 6 fixedly against the spindle 4 under the influence of a tension force along the maneuvering means 18 for example generated by a tension spring 50, whereby a conical torque-transmitting clamping connection 7 is formed between the inner conical clamping surface 4.10 of the spindle and the outer conical envelope surface 9.1 of the hub.

Thereby it is obtained that the saw blade 5 is releasably locked on the spindle with the torque-transmitting conical clamping connection 7 between the saw blade hub 6 and the spindle 4 in combination with the engagement surface 9.5 of the hub being captured by the pawls 11 and through inverse engagement of the hub end 9 around the blocking element 10 by the influence of a tension spring 50 or hydraulic cylinder 25, whereby the hub of the saw blade is connected by being clamped fixedly against the spindle.

FIGS. 2A-B further show that the demolition robot comprises a release mechanism 30 for releasing or freeing the rotatable saw blade in a remote-controllable automatic exchange of the saw blade by the operator. The release mechanism comprises a remote-controllable hydraulic cylinder 25 arranged on the robot arm 2, a maneuvering means 18 displaceably arranged on the spindle and a maneuvering sleeve 15. The hydraulic cylinder is coupled to the maneuvering sleeve 15 via the displaceable maneuvering means.

The maneuvering means 18 consists of an elongated pulling rod coupled to the hydraulic piston of the hydraulic cylinder and extends along the rotational axis of the spindle through the cavity 4.2, 4.3 of the spindle and through the drilled hole 4.20 of the partition wall, whereby the end facing the saw blade is coupled to the maneuvering sleeve 15. The maneuvering means is preferably inserted in a central opening 15.4 in the maneuvering sleeve and thereby coupled to the maneuvering sleeve. The maneuvering means 18 is displaceably accommodated in the spindle along the rotational axis of the spindle to enable the execution of an automatic exchange of the saw blade. A tension spring 50 arranged in the second cavity 4.3 of the spindle is connected to the maneuvering means to apply a tension force on the maneuvering means 18 and the maneuvering sleeve 15 to maintain the torque-transmitting conical clamping connection 7 during operation.

FIGS. 2A-B further show that the end 4.1 of the spindle is coaxially arranged with the hub 6 and end 9 of the saw blade, the blocking element 10, the maneuvering sleeve 15 and the maneuvering means, whereby the blocking element further is coaxially arranged around the maneuvering sleeve 15, so that the blocking element 10 is arranged between the inner limitation surface 9.4 of the hub and the maneuvering sleeve. Thereby a compact and reliable release mechanism is obtained.

FIGS. 2A-B show that the maneuvering sleeve 15 is arranged in the blocking element in the inner cavity of the spindle and has a first end 15.1 protruding towards the saw blade in the longitudinal opening 9.3 of the hub, and a second end 15.2, which is coaxially arranged and slidably displaceable in the feed-through opening 14 of the blocking element and is coupled to the maneuvering means 18 as well as an intermediate piece 15.3, which connects the first and second ends of the maneuvering sleeve. The maneuvering sleeve has a longitudinal central opening 15.4 between the ends for receiving the maneuvering means 18. The maneuvering sleeve is cylindrical with a varying outer cross section, whereby the first end 15.1 has a larger diameter than the second end 15.2. The outer diameter of the first end is smaller than the inner diameter d1 of the hub to enable that the maneuvering sleeve can be displaced out through the longitudinal opening 9.3 of the hub for picking an unused saw blade.

The intermediate piece 15.3 of the maneuvering sleeve is configured with an arched comb surface 16, arranged externally around the circumference, with a diameter that increases towards the saw blade, and which passes into a straight cylindrical surface along the first end. The maneuvering sleeve is displaceably accommodated within the blocking element 10 and is displaceable through the longitudinal opening 9.3 of the hub. Through here, the maneuvering sleeve can assume an activated state, a locking state, whereby the saw blade hub is caused to be releasably locked on the spindle or a deactivating release state, whereby the saw blade hub is caused to be released from the spindle.

The comb surface 16 is arranged so that at displacement of the maneuvering sleeve towards the spindle 4 under the influence of a tension force from the tension spring 50 to a first state, locking state, it can operate or press the pawls to be displaced in radially outward direction and lock them against the inner engagement surface 9.5 of the hub. In the locking state, the comb surface 16 acts actively for the radially resilient pawls 11 not to move radially inwards towards the rotational axis. By remote-controlled activation of the release mechanism and the hydraulic cylinder, the maneuvering sleeve 15 is caused to be displaced or pressed forward through the blocking element 10 and the saw blade hub 6 towards the saw blade 5 under the influence of the hydraulic cylinder in order to assume a second state, a release state. Thereby the pawls 11 of the blocking element is caused to be released from the engagement surface 9.5, and the resilient pawls are caused to be radially displaced towards the rotational axis out of engagement with the hub, whereby the saw blade hub 6 is releasable and comes loose from the spindle 4.

The release mechanism 30 further comprises a remote-controllable hydraulic cylinder 25 arranged on the robot arm in connection with the spindle, adjacent to the second end 4.11 of the spindle. The hydraulic cylinder is coupled to the maneuvering sleeve 15 via the maneuvering means 18. The hydraulic cylinder has a hydraulic piston, which can be single-acting or double-acting. The hydraulic cylinder can be activated via remote-control by the operator, so that automatic exchange of the saw blade is executed. When activating the release mechanism 30 by means of remote activation, the hydraulic piston in the hydraulic cylinder 25 is displaced, wherein the maneuvering means 18 and the maneuvering sleeve 15 are pressed to be displaced axially along the rotational axis towards the saw blade, wherein automatic release of the saw blade is executed, whereupon a new unused saw blade is picked and automatically attached to the spindle.

A remote-controlled automatic exchange of saw blade on the saw tool arranged on the robot arm is executed according to a method, whereby a release mechanism 30 arranged on the robot arm 2 of the demolition robot is activated, and the torque-transmitting connection 7 between the spindle and the saw blade hub is released with the release mechanism. The used saw blade 5 is released with the release mechanism 30 from the spindle 4 and falls down, whereupon an unused saw blade 5' is picked with the end portion 4.1 of the spindle out of a cassette 60, containing at least one unused saw blade 5'. The picked saw blade 5' is attached and releasably locked with a torque-transmitting connection 7 to the end portion 4.1 of the spindle.

The release mechanism 30 is activated e.g. via remote control and activation of the hydraulic cylinder 25 for action on the maneuvering sleeve 15 for release of the torque-transmitting connection 7 by the activated hydraulic cylinder displacing the maneuvering sleeve 15 towards the saw blade 5.

At exchange of the saw blade, the maneuvering means 18 is by means of the hydraulic cylinder 25 pressed outwards towards the hub 6. This results in the pawls 11 being displaced out of engagement against the conical engagement surface 9.5 in the hub and allows the blade 5 to fall out of the receiving portion of the spindle. A new blade 5' is picked up from a pre-assembled cassette 60 and is locked e.g. by the hydraulic pressure on the hydraulic cylinder being drained to a tank or under the influence of the tension spring 50.

The picked unused saw blade 5' is releasably locked with the torque-transmitting connection 7 to the end portion 4.1 of the spindle by a plurality of pawls 11 associated with the blocking element 10 cooperating and forming an inverse engagement with a conically shaped engagement surface 9.5 associated with the saw blade hub 6 under the influence of the tension spring 50 and/or the hydraulic cylinder 25.

The picked unused saw blade 5' is connected, releasably locked, to the end portion 4.1 of the spindle with a maneuvering means 18 that displaces the maneuvering sleeve 15 in the direction from the saw blade 5 under the influence of a tension spring 50 and/or the hydraulic cylinder 25, whereby the maneuvering sleeve 15 presses the blocking element against the engagement surface 9.5 internally arranged in the saw blade hub and an outer conical envelope surface 9.1 associated with the hub is connected with an inner conical clamping surface 4.10 associated with the spindle, so that the hub is clamped fixedly against the spindle.

What is claimed is:

1. A demolition robot comprising a robot arm with a saw tool with an exchangeable saw blade,
    wherein the saw tool comprises a rotatable spindle with an end portion and the saw blade comprising a hub (6),
    wherein the saw blade hub is arranged on the end portion of the spindle with a torque-transmitting connection,
    wherein a release mechanism for automatic exchange of the saw blade is arranged on the robot arm,
    wherein the release mechanism comprises a remote-controllable hydraulic cylinder arranged on the robot arm and a maneuvering sleeve coupled to the hydraulic cylinder via a displaceable pulling rod arranged in the spindle, and
    wherein the torque-transmitting connection is configured as a conical connection, comprising an outer conical envelope surface associated with the hub and an inner conical clamping surface associated with the spindle,
    wherein the maneuvering sleeve is arranged to cooperate with a block (10) integrated in the spindle,
    wherein the block has a first end with a plurality of radially outwardly directed pawls arranged around the circumference, and said pawls are resilient and maneuverable in radially outward direction and configured to engage with and capture an inner conical engagement surface of the hub,
    wherein in a locking state, the maneuvering sleeve is arranged to operate the block under the influence of a tension force along the pulling rod,
    wherein the block in a locking state is arranged to releasably retain the saw blade hub, by pressing the pawls radially outwards for engagement with the engagement surface of the hub,
    wherein in a release state, the hydraulic cylinder is activated, and the maneuvering sleeve is caused to be displaced or pressed forward through the block and the saw blade hub towards the saw blade, and
    wherein under the influence of the hydraulic cylinder, the block is caused to release the hub under the influence of the maneuvering sleeve, and the saw blade hub is caused to be released from the end portion of the spindle, wherein the saw blade comes loose from the spindle.

2. The demolition robot according to claim 1, wherein the block is inserted in a longitudinal opening arranged in the hub of the saw blade.

3. The demolition robot according to claim 2, wherein the internally arranged conically shaped engagement surface of the saw blade hub is arranged to cooperate by inverse engagement with the block, wherein the saw blade can releasably be retained on the spindle.

4. The demolition robot according to claim 3, wherein the pawls in the locking state are pressed against the inner engagement surface of the hub by the maneuvering sleeve under the influence of a tension force acting on the pulling rod, wherein the torque-transmitting conical clamping connection is formed.

5. The demolition robot according to claim 4, wherein, in the locking state, the spindle end is coaxially arranged with the saw blade hub, wherein the saw blade hub is arranged to receive the block with the associated plurality of pawls as well as the maneuvering sleeve, wherein the saw blade hub is coaxially arranged and surrounds the block and the maneuvering sleeve, and the block is arranged between the hub and the maneuvering sleeve.

6. The demolition robot according to claim 4, wherein the maneuvering sleeve is displaceably arranged in the block in an inner cavity arranged in the spindle, wherein the maneuvering sleeve comprises a longitudinal central opening for receiving the pulling rod and is coupled to the pulling rod, wherein the maneuvering sleeve is displaceable through a feed-through opening arranged in the block and is displaceable through the longitudinal opening of the hub towards the saw blade, wherein the maneuvering sleeve is configured with an outer comb surface arranged to cooperate with the pawls of the block.

7. The demolition robot according to claim 6, wherein the comb surface of the maneuvering sleeve is arranged, at displacement of the maneuvering sleeve towards the spindle to a locking state, to press the pawls to be displaced in radially outward direction and lock them against the inner engagement surface of the hub, wherein, in a release state, when the maneuvering sleeve is displaced towards the saw blade, the comb surface is displaced out of contact with the pawls, which are thereby released from the engagement surface, wherein the saw blade hub can be released from the spindle.

8. The demolition robot according to claim 4, wherein, in a locking state, the saw blade is releasably locked on the spindle with the torque-transmitting conical clamping connection, which is formed between the saw blade hub and the spindle in combination with the engagement surface of the hub being captured by the pawls through inverse engagement of the hub end around the block under the influence of the maneuvering sleeve being displaced by a tension spring or the hydraulic cylinder.

9. The demolition robot according to claim 8, wherein, in a release state, the hydraulic cylinder is activated, and the maneuvering sleeve is caused to be displaced through the spindle and the saw blade hub under the influence of the hydraulic cylinder, wherein the pawls of the block are caused to be released from engagement with the hub, and the saw blade is caused to be released from the spindle.

10. The demolition robot according to claim 8, wherein the tension spring is arranged in the spindle and is connected to the pulling rod, and
    wherein the tension spring influences the pulling rod and the maneuvering sleeve with a tension force to maintain the torque-transmitting conical clamping connection.

11. A method for remote-controllable automatic exchange of the saw blade on the saw tool associated with the demolition robot according to claim 1, wherein the saw blade is releasably arranged with a torque-transmitting connection on the spindle associated with the saw tool,
    wherein the method comprises the following steps;

in a release state, activating the release mechanism arranged on the robot arm of the demolition robot by remote control of the hydraulic cylinder, whereby the hydraulic cylinder displaces the maneuvering sleeve towards the saw blade, releasing the torque-transmitting connection with the release mechanism by the block being caused to be released from engagement with the hub under the influence of the maneuvering sleeve, whereby the saw blade hub is caused to be released from the end portion of the spindle, so that the used saw blade is released and falls from the spindle, picking up an unused saw blade with the spindle from a cassette, comprising at least one unused saw blade, in a locking state, connecting the picked unused saw blade releasably with a torque-transmitting connection to the end portion of the spindle by the block integrated in the spindle being brought to a releasably retaining engagement with the saw blade hub under the influence of the maneuvering sleeve being displaced in the direction from the saw blade by a tension spring and/or the hydraulic cylinder.

12. The method according to claim 11, whereby the block is arranged to cooperate through an inverse engagement with the saw blade hub.

13. The method according to claim 11, whereby the maneuvering sleeve presses the block against the engagement surface internally arranged in the saw blade hub, so that the hub is fixedly clamped against the end portion of the spindle by the outer conical envelope surface associated with the hub being connected with the inner conical clamping surface associated with the spindle and forms the torque-transmitting conical clamping connection.

* * * * *